United States Patent [19]

Comerci

[11] Patent Number: 5,190,380
[45] Date of Patent: Mar. 2, 1993

[54] DEVICE FOR COMPENSATING EXPANSION IN ROTATORY EQUIPMENT

[76] Inventor: Vicente Comerci, San Juan 4284, Buenos Aires, Argentina, 1233

[21] Appl. No.: 806,375

[22] Filed: Dec. 13, 1991

[30] Foreign Application Priority Data

Nov. 4, 1991 [AR] Argentina .................. 321088

[51] Int. Cl.$^5$ .................. F16C 23/06; F16C 19/52
[52] U.S. Cl. .................. 384/493; 384/519
[58] Field of Search ............ 384/493, 512, 519, 537, 384/557

[56] References Cited

U.S. PATENT DOCUMENTS

| | | | |
|---|---|---|---|
| 2,530,323 | 11/1950 | Boyd | 384/611 |
| 3,469,897 | 9/1969 | Rike | 384/542 |
| 3,692,372 | 9/1972 | Pineo | 384/557 |
| 4,226,485 | 10/1980 | Pruvot | 384/557 |
| 4,398,774 | 8/1983 | Voll et al. | 384/493 |

FOREIGN PATENT DOCUMENTS

| | | | |
|---|---|---|---|
| 164224 | 12/1981 | Japan | 384/493 |
| 144818 | 8/1984 | Japan | 384/493 |

*Primary Examiner*—Thomas R. Hannon
*Attorney, Agent, or Firm*—Jacobson, Price, Holman & Stern

[57] ABSTRACT

An assembly of rotatory engines and the like, for counteracting the effects produced by expansion in engines of this kind, in which at least one of the shaft ends, through a bearing and adjustment nut, is mounted on a cross plate, the shape of said plate being the same as that of the cross section of the stator, said plate being provided with an expansion groove (joint). This plate is to be placed between the rotor and the engine cover or, alternatively, it replaces the cover.

3 Claims, 1 Drawing Sheet

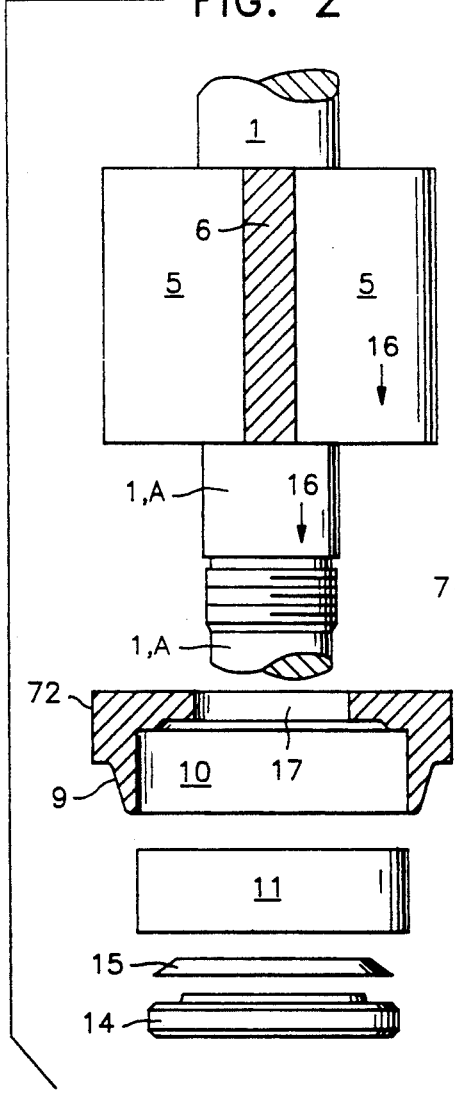
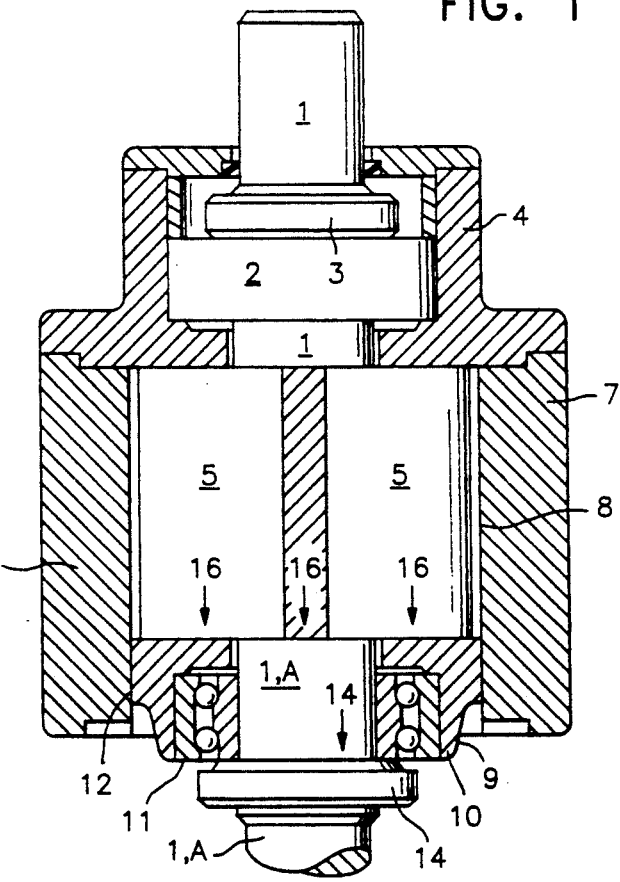
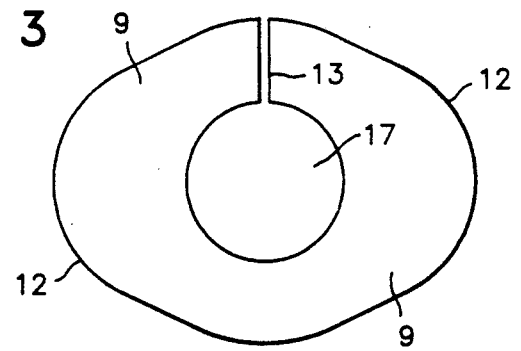
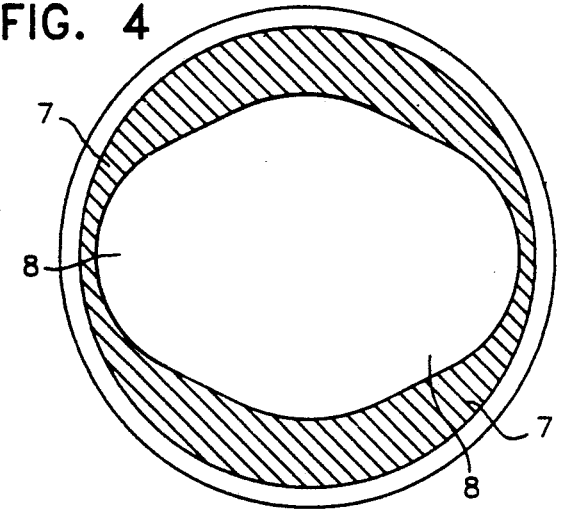
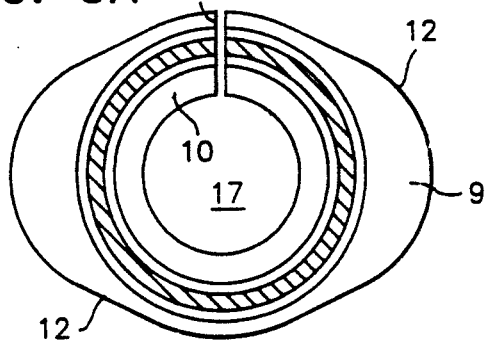

5,190,380

DEVICE FOR COMPENSATING EXPANSION IN ROTATORY EQUIPMENT

FIELD OF THE INVENTION—PRIOR ART

The instant invention relates to a device for compensating expansion in rotatory equipment in general, such as those used in vacuum or pressure pumps, compressors, overfeeders, pneumatic engines, hydraulic engines or combustion engines.

As known in the art, all mechanisms transforming or consuming power having friction elements, produce temperature raising on the parts and, consequently, expansion thereof. For example, in an equipment comprised by blade cells, if the rotor shaft and the blades are made of the same size as that allowing the useful capacity of the stator, except for the gap or clearance required to assure its free rotation, a very good working pressure is obtained, which indicates a proper tight seal with a good thermal and dynamic yield, but after some minutes and due to the expansion effect, the rotor shaft and the blades expand longitudinally before the stator, due to the fact that the stator is subjected to higher cooling, since it is in contact with the outside or because it is easier to cool it with additional equipment; on the other hand it is more difficult to cool the rotor shaft and its expanding blades since heat dissipation is lower than that taking place at the stator. Consequently, the rotor shaft and its blades expand thus increasing their length, which causes high friction and braking action of the rotor shaft and its blades against the sides or covers of such equipment, and if such action persists, higher power will be consumed and the equipment will be damaged.

If, on the other hand, expansion of the rotor shaft and the blades is computed at certain temperature and, the rotor and the blades are made with such allowance, gap or clearance, such cool operating equipment will have very low yield due to the high pressure losses; but once the optimum temperature is attained, care should be exercised to avoid exceeding such limit, thus avoiding overheating.

Due to the above disadvantages, most of manufacturers have decided to increase the rotor diameter and, if the cubic capacity sought is not so obtained, two or three rotors are mounted on the same driving shaft, in order to obtain lower expansion, since the smaller the rotor length, the smaller the expansion.

The above alternative causes other problems such as, when increasing the rotor diameter the size of the whole equipment is also increased, thus making its mounting cumbersome and raising its cost. Further, the increase in the rotor diameter makes that all fluid retention elements be subjected to severe working conditions since they should seal the whole surface of the covers or sides and the whole inner assembly of the stator. An example is the Wankel engine having high technology elements for retaining fluids, thus increasing the costs. Such elements, when expanding, lock into their housings, break and wear quickly due to the excessive effort they should withstand.

SUMMARY OF THE INVENTION

The instant invention solves the above disadvantages by means of a device for compensating expansion of the rotor shaft, such device being comprised by a sliding plate mounted on the driving shaft by means of bearings and fixed thereto by means of an adjustment nut, the plate being faced to one of the rotor sides, the outer contour having the same shape as that of the cross section of the stator, therefore this plate is mounted within the stator and accompanies the longitudinal expansion of the shaft thus compensating such expansion.

BRIEF DESCRIPTION OF THE DRAWINGS

FIG. 1 shows an exemplary embodiment comprised by blades; this is due to the fact that the compensating device based on the sliding plate and its function may be applied to rotatory equipment in general.

FIG. 2 shows the driving shaft, its rotor and the sliding plate.

FIG. 3 shows the sliding plate from both sides.

FIG. 4 is a front view of the stator.

In all figures, the same reference numbers correspond to the same or equivalent parts, as follows:

1 and 1A, driving shaft
2  bearing
3  adjustment nut
4  bearing support
5  rotor
6  blades
7  stator
8  inner configuration of the stator
9  sliding plate
10  bearing housing
11  bearing
12  outer contour of the sliding plate
13  expansion groove
14  adjustment nut
15  lock washer
16  arrows indicating expansion
17  plate hole

DETAILED DESCRIPTION OF THE INVENTION

In FIGS. 1 and 2 a rotatory equipment comprised by blades, to which the compensating device based on the plate 9 sliding has been adapted, is shown. Since the problem is the longitudinal expansion of rotor 5, its driving shaft 1 and 1A and of blades 6, and due to the fact that the expansion coefficients are very similar in all cases, at least one plate 9 is required sliding within the interior 8 of the stator 7, to absorb said "A" expansion and allow free rotation of rotor 5. Further, since the plate 9 is mounted through a bearing and fixed to the driving shaft 1,A through nut 14, the required gap or clearance for allowing the free rotation between the rotor 5 front portions and the plate 9 is maintained constant whether running cool or hot.

FIG. 3 shows the sliding plate 9 constituting the device. The device is comprised by both front portions, and the hole 17 through which the driving shaft 1,A passes may be seen, also the bearing housing 10 and the expansion groove absorbing the cross expansion of the plate are shown; while the outer configuration 12 is exactly the same as the inner configuration, i.e. the cross section 8 of the stator 7 in FIG. 4; therefore, this device for compensating the expansion is based on the sliding of plate 9 and on the fact that its outer contour 12 is, in all cases, the same as that chosen for the particular rotatory equipment.

I claim:

1. In rotary equipment comprising a stator, a rotor mounted within said stator, and a driving shaft driven by said rotor, a device for compensating expansion of the rotary equipment, wherein said device comprises a sliding plate with a seat on which a bearing is housed, said sliding plate being mounted on the driving shaft and fixed thereto by an adjustment nut, said sliding plate having an outer configuration equal to the cross section selected for the stator, said sliding plate being further provided with an expansion groove.

2. A device according to claim 1, wherein said stator is open at one end so as to receive said sliding plate, said sliding plate thereby enclosing said rotor within said stator.

3. A device according to claim 1, wherein said expansion groove extends radially through said sliding plate.

* * * * *